United States Patent
Yoon et al.

[19]

[11] Patent Number: 5,870,416
[45] Date of Patent: Feb. 9, 1999

[54] SEMI-MONOLITHIC RING CAVITY FOR SECOND HARMONIC GENERATION OF LASER FREQUENCY

[75] Inventors: Tai Hyan Yoon; Myung Sai Chung, both of Taejon, Rep. of Korea

[73] Assignee: Korea Research Institute of Standards and Science, Taejon, Rep. of Korea

[21] Appl. No.: 886,510

[22] Filed: Jul. 1, 1997

[30] Foreign Application Priority Data

Mar. 20, 1997 [KR] Rep. of Korea ............... 1997 9474

[51] Int. Cl.$^6$ ........................................ H01S 3/10
[52] U.S. Cl. .................. 372/22; 372/28; 372/93; 372/99; 372/98
[58] Field of Search ................. 372/93, 94, 22, 372/28, 98, 99

[56] References Cited

U.S. PATENT DOCUMENTS

| | | | |
|---|---|---|---|
| 4,764,933 | 8/1988 | Kozlovsky et al. | 372/22 |
| 5,027,361 | 6/1991 | Kovlovsky et al. | 372/22 |
| 5,231,643 | 7/1993 | Naya et al. | 372/94 |

*Primary Examiner*—Leon Scott, Jr.
*Attorney, Agent, or Firm*—Jacobson, Price, Holman & Stern, PLLC

[57] ABSTRACT

A semi-monolithic ring cavity for a second harmonic generation of laser frequency including a nonlinear crystal, an input mirror, an output mirror, a first point, at which a fundamental wave is incident onto the input mirror, a second point, at which the fundamental wave is incident onto the output mirror along with a second harmonic wave, and a third point, at which the fundamental wave reflects totally from a side surface of the nonlinear crystal. One of the input and output mirrors is coated with a dielectric and separated from the nonlinear crystal whereas the other mirror is formed on the nonlinear crystal. The fundamental wave forms a ring cavity in such a manner that the second harmonic wave is generated only along an axis extending through the first and second points. The semi-monolithic ring cavity exhibits a stable frequency characteristic and a high transform efficiency when a second-harmonic generation of continuous-wave laser frequency is carried out. Accordingly, the semi-monolithic ring cavity is expected to provide desired effects in a variety of technical fields. Using the high frequency tuning characteristic of the semi-monolithic ring cavity, it is also possible to develop an optical frequency standard exhibiting a frequency stability higher than those of conventional optical frequency standards.

6 Claims, 2 Drawing Sheets

SEMI-MONOLITHIC RING CAVITY FOR SECOND HARMONIC GENERATION OF LASER FREQUENCY

BACKGROUND OF THE INVENTION

1. Field of the Invention

The present invention relates to a semi-monolithic ring cavity for a second harmonic generation of laser frequency which includes normal mirrors and a nonlinear crystal, and more particularly to a semi-monolithic ring cavity for a second harmonic generation of laser frequency which includes a nonlinear crystal, an input mirror, an output mirror separated from the input mirror, a first point, at which a fundamental wave is incident onto the input mirror, a second point, at which the fundamental wave is incident onto the output mirror along with a second harmonic wave, and a third point, at which the fundamental wave reflects totally from a side surface of the nonlinear crystal.

2. Description of the Prior Art

Generally, the efficiency of a second harmonic generation of continuous-wave laser frequency is very low. For this reason, an external power build-up cavity is arranged at the outside of a laser. Known configurations of external cavities for a second harmonic generation of laser frequency are classified into three types as follows:

1) Discrete Open Cavity

A discrete open cavity is illustrated in FIG. 2. As shown in FIG. 2, the discrete open cavity includes three or four mirrors (In the illustrated case, four mirrors M1 to M4) which constitute an external cavity. These mirrors M1 to M4 are separated from a nonlinear crystal 5. A fundamental wave is maintained in the form of a ring in the external cavity.

Since such a discrete open cavity includes three or four mirrors separated from a nonlinear crystal and individually mounted to different optical mounts, its external cavity has a size very larger than those of monolithic ring cavities and semi-monolithic standing-wave cavities. Furthermore, it is difficult to obtain a dynamically stable cavity. Where the $TEM_{00}$ mode of the discrete open cavity is locked at the frequency of the fundamental wave, this locking is easily broken due to a variety of surrounding noise. The polarized beam of the second harmonic wave is perpendicular to the fundamental wave upon the matching of the first phases on both incident surface of the nonlinear crystal 5. A beam scattering phenomenon occurs on the mirrors M1 to M4. As a result, the optical loss caused by the reflection is large, thereby degrading the second-harmonic wave transform efficiency.

In FIG. 2, the reference numeral 10 denotes a laser, 11 a reflecting beam of the fundamental wave, 12 a piezo-electric drive element for modulation, 13 a piezo-electric drive element for control, and 14 an isolator. The reference character BP denotes a brewster plate arranged for the compensation for an astigmatism.

2) Monolithic Cavity

This monolithic cavity includes two mirrors constituting an external cavity. These mirrors are integral with a nonlinear crystal adapted to generate a second harmonic wave. The formation of the mirrors is achieved by directly machining the nonlinear crystal and coating a dielectric on the machined portions of the nonlinear crystal. In the external cavity, a fundamental wave is maintained in the form of a ring.

Such a monolithic cavity has no drawback involved in the above-mentioned discrete open cavity. That is, the monolithic cavity is very stable in terms of dynamics because the external cavity thereof is integral with the nonlinear crystal. The monolithic cavity also has a high second-harmonic wave generation (namely, transform) efficiency, as compared to the discrete open cavity. However, such a monolithic cavity is problematic in that it involves a very low frequency response speed and a limited continuous frequency tuning range. This is because although the frequency of the monolithic cavity should be tuned simultaneously with the frequency of the fundamental wave while being locked at the frequency of the fundamental wave, the frequency tuning depends on the control for the temperature of the nonlinear crystal in the monolithic cavity.

3) Semi-monolithic Standing-wave Cavity

This semi-monolithic standing-wave cavity includes two mirrors constituting an external cavity. One of the mirrors is a general laser mirror whereas the other mirror is integral with a nonlinear crystal adapted to generate a second harmonic wave. The latter mirror is formed by directly machining one surface of the nonlinear crystal and coating a dielectric on the machined surface of the nonlinear crystal. In the external cavity, a fundamental wave exists in the form of a standing wave.

One of the mirrors in such a semi-monolithic standing-wave cavity corresponds to one mirror surface of the above-mentioned monolithic cavity which is replaced by a general mirror separated from the nonlinear crystal. This mirror is arranged on a piezo-electric drive element capable of achieving a high-speed frequency tuning. Accordingly, the semi-monolithic standing-wave cavity has a high frequency stability and a continuous frequency tuning characteristic. However, this semi-monolithic standing-wave cavity inevitably involves a frequency disturbance of the fundamental wave laser due to the feedback of the fundamental wave which reflects from the incident surface of the semi-monolithic standing-wave cavity and then returns to the laser. For this reason, the semi-monolithic cavity should use an expensive optical isolator. In this semi-monolithic standing-wave cavity, second harmonic waves are generated which travel in the same direction as the travel direction of the fundamental wave and in the opposite direction to the travel direction of the fundamental wave, respectively. Accordingly, it is required to match the phases of the second harmonic waves travelling in both directions in order to obtain a high second-harmonic wave transform efficiency. Under this condition, a second harmonic wave is generated in the same direction as the travel direction of the fundamental wave. Accordingly, it is also required to use a polarization beam splitter in order to separate the generated second harmonic wave from the fundamental wave.

SUMMARY OF THE INVENTION

Therefore, an object of the invention is to solve the problems involved in the above-mentioned conventional external cavities and to provide a compact semi-monolithic ring cavity for a second harmonic generation of laser frequency which is used as an external cavity for a second-harmonic generation of continuous-wave laser frequency exhibiting a high second-harmonic wave transform efficiency.

In accordance with one aspect, the present invention provides a semi-monolithic ring cavity for a second harmonic generation of laser frequency including a nonlinear crystal, an input mirror coated with a dielectric and separated from the nonlinear crystal, an output mirror formed on a surface of the nonlinear crystal, a first point, at which a fundamental wave is incident onto the input mirror, a second point, at which the fundamental wave is incident onto the output mirror along with a second harmonic wave, and a third point, at which the fundamental wave reflects totally from a side surface of the nonlinear crystal, wherein the fundamental wave forms a ring cavity in such a manner that the second harmonic wave is generated only along an axis extending through the first and second points.

In accordance with another aspect, the present invention provides a semi-monolithic ring cavity for a second harmonic generation of laser frequency including a nonlinear crystal, an input mirror formed on a surface of the nonlinear crystal, an output mirror coated with a dielectric and separated from the nonlinear crystal, a first point, at which a fundamental wave is incident onto the input mirror, a second point, at which the fundamental wave is incident onto the output mirror along with a second harmonic wave, and a third point, at which the fundamental wave reflects totally from a side surface of the nonlinear crystal, wherein the fundamental wave forms a ring cavity in such a manner that the second harmonic wave is generated only along an axis extending through the first and second points.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

The present invention concerns a semi-monolithic ring cavity capable of solving drawbacks involved in both the conventional monolithic ring cavity and semi-monolithic standing-wave cavity, thereby efficiently generating a second harmonic generation of continuously oscillating laser frequency.

Figure 1A:
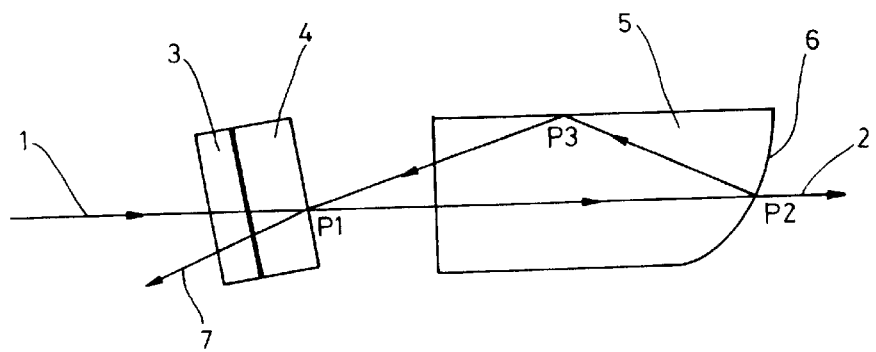
FIG. 1a is a schematic view illustrating a semi-monolithic ring cavity for a second harmonic generation of laser frequency according to an embodiment of the present invention.
Figure 1B:
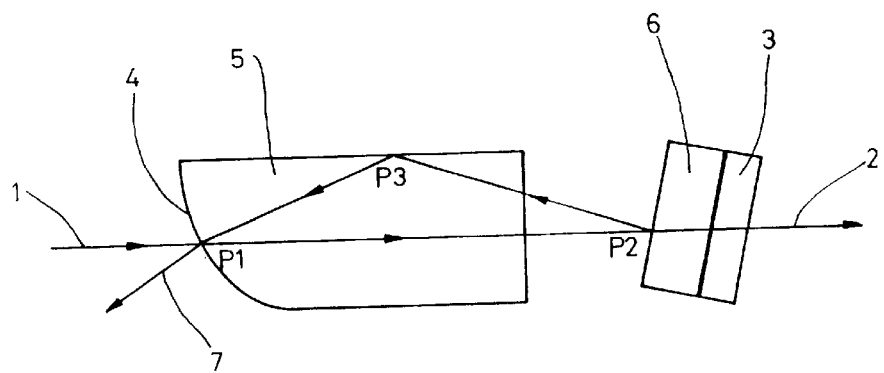
FIG. 1b is a schematic view illustrating a semi-monolithic ring cavity for a second harmonic generation of laser frequency according to another embodiment of the present invention.

FIGS. 1a and 1b illustrate semi-monolithic ring cavities of different types for a second harmonic generation of continuous oscillating laser frequency, respectively. In either case of FIG. 1a or 1b, the semi-monolithic ring cavity is defined with points P1 to P3 for the incidence or reflection of a fundamental wave for a second harmonic generation of laser frequency. The point P1 is defined on an input mirror (coupler) 4, the point P2 defined on an output mirror (coupler) 6, and the point P3 is defined on one surface of a nonlinear crystal 5. The semi-monolithic ring cavities of FIGS. 1a and 1b are different in configuration in that the input mirror 4 is constituted by a dielectric-coated mirror in the case of FIG. 1a and one surface of the nonlinear crystal 5 in the case of FIG. 1b whereas the output mirror 6 is constituted by one surface of the nonlinear crystal 5 in the case of FIG. 1a and a dielectric-coated mirror in the case of FIG. 1b. In either case of FIG. 1a or 1b, the axis extending though both the points P1 and P2 is an axis which satisfies the first type phase matching condition of the nonlinear crystal 5 for the generation of a second harmonic wave 2 based on the fundamental wave. In FIGS. 1a and 1b, the fundamental wave is denoted by the reference numeral 1. The point P3 is a point at which the fundamental wave 1 reflects totally within the nonlinear crystal 5.

The semi-monolithic ring cavity of either case of FIG. 1a or 1b according to the present invention have the following configuration and function:

1) The mirror and nonlinear crystal, which constitute the semi-monolithic ring cavity, are separated from each other. The mirror, which is an input mirror in the case of FIG. 1a and an output mirror in the case of FIG. 1b, is arranged on a piezo-electric drive element 3 to constitute an external cavity. By virtue of such a configuration, a high-speed frequency modulation and tuning is achieved.

That is, the frequency of the fundamental wave resonates within the external cavity in every free spectral range given in accordance with the length of the external cavity. Accordingly, a maximum fundamental wave output is incident onto the external cavity. For this reason, when the frequency of the fundamental laser is rapidly modulated or tuned, the length of the external cavity should be modulated or tuned at the same speed as that of the fundamental laser frequency. In monolithic cavities, such a length modulation and tuning is carried out at a very low speed because the length of the external cavity varies in accordance with the temperature of the nonlinear crystal. In accordance with the present invention, however, it is possible to achieve a rapid frequency modulation and tuning at a speed of several kilo Hertz by use of the mirror attached to the piezo-electric drive element 3. Accordingly, the external cavity is locked with a high frequency stability at the frequency of the fundamental wave 1. Thus, a generation of the second harmonic wave 2 at a high efficiency is achieved.

Accordingly, the $TEM_{00}$ mode of the semi-monolithic ring cavity is stabilized at the frequency of the fundamental wave 1, thereby achieving a great improvement in the tuning range and speed of continuous frequency which are disadvantageously limited in conventional monolithic cavities.

Figure 2:
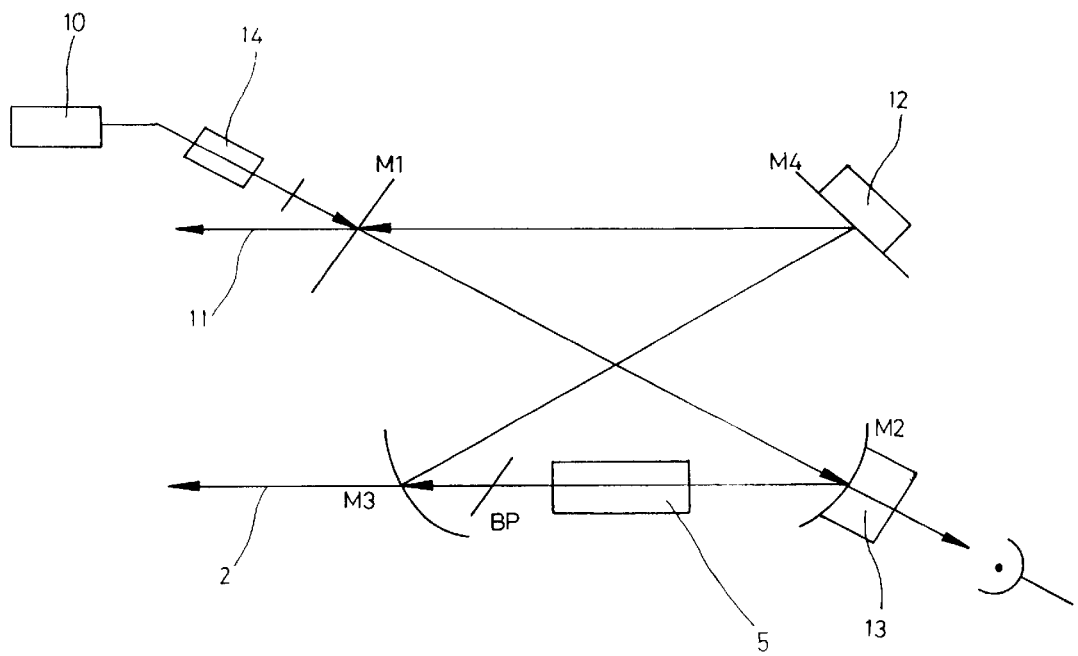
FIG. 2 is a schematic view illustrating a conventional discrete open cavity.

Tests were performed to measure the frequency modulation and tuning characteristics of external cavities using a piezo-electric drive element in accordance with the present invention and the prior art, respectively. As a result of the tests, it was found that where the mirror M4 of the open cavity shown in FIG. 2 was attached to the piezo-electric drive element, a modulation speed of 10 kHz or more was obtained. Where the mirror M2 of FIG. 2 was attached to a low-voltage piezo-electric drive element, a frequency tuning characteristic of 50 GHz or more was obtained. In the case of a second harmonic generation device using a commercially available monolithic cavity, however, a frequency tuning characteristic of 200 MHz/min or less and a continuous frequency tuning range of 10 GHz or less were obtained. Accordingly, the conventional device have difficulties in research on the optical frequency standard.

2) In the semi-monolithic ring cavity according to the present invention, the fundamental wave 1 forms a ring cavity. Accordingly, the second harmonic wave 2 is generated only in the direction connecting the point P1, at which the fundamental wave 1 is incident onto the input mirror 4, and the point P2, at which the fundamental wave 1 and second harmonic wave 2 are incident onto the output mirror 6. In other words, the second harmonic wave 2 is generated in the same direction as the travel direction of the fundamental wave 1 without the problem involved in conventional semi-monolithic standing-wave cavities in which second harmonic waves are generated in both directions.

3) The semi-monolithic ring cavity of the present invention provides a high frequency and output stability because it basically solves a frequency instability caused by the feedback of a fundamental wave, which reflects from four surfaces and returns to a laser, in conventional standing-wave cavities.

If the fundamental wave does not resonate within the external cavity, then a large portion of the fundamental wave reflects from the input mirror. For example, where the input mirror has a reflection factor of 5%, about 95% of the fundamental wave reflects from the input mirror. In the case of semi-monolithic standing-wave cavities, the fundamental wave output reflected from the input mirror is incident again onto the fundamental wave laser. This results in a frequency disturbance. In the case of the semi-monolithic ring cavity according to the present invention, however, the fundamental wave output reflected rom the input mirror travels in the same direction as the travel direction of the reflecting wave 7, as shown in FIGS. 1a and 1b. Accordingly, it is possible to basically solve the optical feedback problem.

As apparent from the above description, the present invention provides a semi-monolithic ring cavity for a second harmonic generation of laser frequency which is capable of exhibiting a stable frequency characteristic and a high transform efficiency when a second-harmonic generation of continuous-wave laser frequency is carried out. Accordingly, the semi-monolithic ring cavity is expected to provide desired effects in a variety of technical fields. In particular, it is possible to develop a high-power continuous output laser used in a short wavelength range by use of a compact high-stable semi-monolithic ring cavity according to the present invention. Using the high frequency tuning characteristic of the semi-monolithic ring cavity according to the present invention, it is also possible to develop an optical frequency standard exhibiting a frequency stability higher than those of conventional optical frequency standards.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A semi-monolithic ring cavity for a second harmonic generation of laser frequency including a nonlinear crystal, an input mirror coated with a dielectric and separated from the nonlinear crystal, an output mirror formed on a surface of the nonlinear crystal, a first point, at which a fundamental wave is incident onto the input mirror, a second point, at which the fundamental wave is incident onto the output mirror along with a second harmonic wave, and a third point, at which the fundamental wave reflects totally from a side surface of the nonlinear crystal, wherein the fundamental wave forms a ring cavity in such a manner that the second harmonic wave is generated only along an axis extending through the first and second points.

2. The semi-monolithic ring cavity in accordance with claim 1, wherein the input mirror is arranged on a piezo-electric drive element, thereby enabling a high-speed frequency modulation and control.

3. A semi-monolithic ring cavity for a second harmonic generation of laser frequency including a nonlinear crystal, an input mirror formed on a surface of the nonlinear crystal, an output mirror coated with a dielectric and separated from the nonlinear crystal, a first point, at which a fundamental wave is incident onto the input mirror, a second point, at which the fundamental wave is incident onto the output mirror along with a second harmonic wave, and a third point, at which the fundamental wave reflects totally from a side surface of the nonlinear crystal, wherein the fundamental wave forms a ring cavity in such a manner that the second harmonic wave is generated only along an axis extending through the first and second points.

4. The semi-monolithic ring cavity in accordance with claim 3, wherein the output mirror is arranged on a piezo-electric drive element.

5. The semi-monolithic ring cavity in accordance with claim 1 or 3, wherein the axis extending through the first and second points, which is associated with the generation of the second harmonic wave, is an axis which satisfies the first type phase matching condition of the nonlinear crystal.

6. The semi-monolithic ring cavity in accordance with claim 1 or 3, wherein the fundamental wave reflects from four surfaces in a direction in which a reflecting wave from the input mirror travels.

* * * * *